C. C. HANSEN.
ROCK DRILL.
APPLICATION FILED AUG. 8, 1911.

1,057,733.

Patented Apr. 1, 1913.

Witnesses:
F. George Barry.
Otto W. Holmgren.

Inventor:
Charles C. Hansen
by his attorneys

UNITED STATES PATENT OFFICE.

CHARLES C. HANSEN, OF EASTON, PENNSYLVANIA, ASSIGNOR TO INGERSOLL-RAND COMPANY, OF NEW YORK, N. Y., A CORPORATION OF NEW JERSEY.

ROCK-DRILL.

1,057,733.   Specification of Letters Patent.   Patented Apr. 1, 1913.

Application filed August 8, 1911.   Serial No. 643,007.

*To all whom it may concern:*

Be it known that I, CHARLES C. HANSEN, a citizen of the United States, and resident of Easton, in the county of Northampton and State of Pennsylvania, have invented a new and useful Improvement in Rock-Drills, of which the following is a specification.

This invention relates to improvements in rock drills and has for its object to provide certain improvements in the construction, form and arrangement of the drill bit, the chuck and the means connecting the bit with the chuck.

Figure 1:
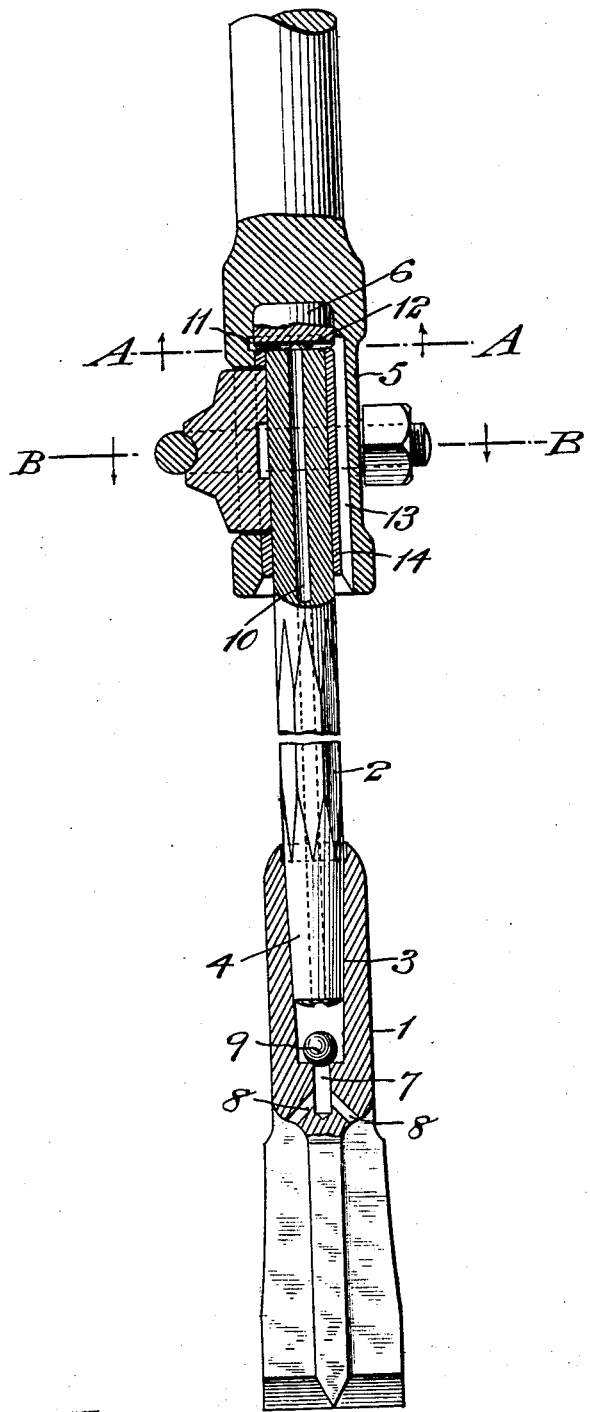
Figure 2:
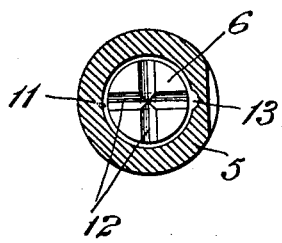
Figure 3:
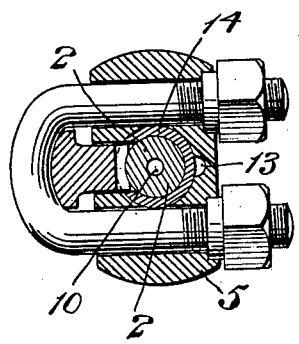

In the accompanying drawings, Figure 1 represents partly in side elevation and partly in section the drill bit, its steel and the work piston chuck in which the steel is seated, Fig. 2 is a transverse section taken in the plane of the line A—A of Fig. 1, and Fig. 3 is a transverse section taken in the plane of the line B—B of Fig. 1.

The drill bit is denoted by 1 and its hollow steel by 2. The drill bit is herein shown as removably attached to its steel by providing the upper end of the bit with a flaring socket 3 and the lower end of a drill steel with the tapered portion 4 arranged to enter said socket. The upper end of the hollow drill steel 2 is held by a chuck 5, a chuck button 6 being interposed between the upper end of the drill steel and the bottom of the chuck socket.

The bit 1 is provided with an axially arranged passage 7 leading from the bottom of the socket 3, which passage is provided with one or more outwardly extended holes 8 directed toward the cutting edge of the bit. A check valve 9 for this passage 7 is located in the socket 3 between the upper end of the passage 7 and the lower end of the drill steel 2. This drill steel 2 is provided with an axially arranged passage 10 opening through the upper and lower ends of the drill steel.

An annular chamber 11 is provided near the bottom of the chuck socket around the chuck button 6 and the chuck button is provided with one or more grooves 12 for bringing the bore 10 of the hollow drill steel into communication with said annular chamber 11. A passage 13 leads from this chamber 11 downwardly to the bottom of the chuck exterior to the bushing 14 for directing the water and other material which is discharged from the upper end of the steel downwardly along the steel.

In operation; as the bit and its steel are reciprocated in the usual manner by the rock drill, the drilled material in the hole being bored will, together with the water supplied to the hole, be forced upwardly through the hole 8, passage 7 and passage 10 past the check valve 9. As the check valve 9 will not permit the material to pass downwardly again into the hole, the continued reciprocation of the bit will finally cause the material with its water carried thereby to be discharged from the upper end of the drill steel where it will pass outwardly through the channels in the bottom of the chuck button 6 into the annular chamber 11 and from thence downwardly along the passage 13 in the chuck.

The usual practice is to cover the mouth of the hole around the steel by means of a piece of bagging or burlap or other material which will retain the coarser cut material and permit the water to filter back again into the hole thus effecting a material saving in the amount of water used in the drilling operation. The directing of the pumped material and water downwardly along the drill steel also permits the operator to stand in close proximity to the hole being drilled.

It is evident that changes might be resorted to in the form, construction and arrangement of the several parts without departing from the spirit and scope of my invention; hence I do not wish to limit myself strictly to the structure herein set forth, but

What I claim is:—

1. A drill bit and its steel having a passage for the discharge of the cut material, a check valve for said passage and a chuck for the steel having a passage for directing the discharged material downwardly along the steel.

2. A drill bit and its steel having a passage for the discharge of the cut material, a check valve for said passage, a chuck for the steel having a passage for directing the discharged material downwardly along the steel and a chuck button having one or more grooves for bringing the passage in the steel into open communication with the passage in the chuck.

3. A drill bit and its steel having a pas- sage for the discharge of the cut material, a check valve for said passage, a chuck for the steel having an annular chamber and a passage leading downwardly therefrom for directing the discharged material downwardly along the steel.

4. A drill bit and its steel having a passage for the discharge of the cut material, a check valve for said passage, a chuck for the steel having an annular chamber, a passage leading downwardly therefrom for directing the discharged material downwardly along the steel, and a chuck button, having one or more grooves for bringing the passage in the steel into communication with said annular chamber and passage in the chuck.

In testimony, that I claim the foregoing as my invention, I have signed my name in presence of two witnesses, this fourth day of August 1911.

CHARLES C. HANSEN.

Witnesses:
F. George Barry,
C. S. Sundgren.